United States Patent Office 3,752,845
Patented Aug. 14, 1973

---

3,752,845
N,N-BIS-HALOGENOMETHYL-CARBAMIC ACID ESTERS
Claus Beermann, Neu-Isenburg, Volkmar Georgi and Karl Waldmann, Frankfurt am Main, and Erhard Wolf, Hofheim am Taunus, Germany, assignors to Farbwerke Hoechst Aktiengesellschaft vormals Meister Lucius & Brüning, Frankfurt am Main, Germany
No Drawing. Filed July 8, 1969, Ser. No. 840,028
Claims priority, application Germany, July 19, 1968,
P 17 68 983.7
Int. Cl. C07c 125/06
U.S. Cl. 260—482 C
6 Claims

ABSTRACT OF THE DISCLOSURE

N,N-bis-halogenomethyl-carbamates are formed by reacting urethanes with formaldehyde or compounds capable of yielding formaldehyde and halogenating agents, especially inorganic acid halides. The compounds are useful intermediates and cross-linking agents.

---

The present invention relates to N,N-bis-halogenomethyl-carbamic acid esters of the general Formula I $$(XCH_2)_2N\text{—}COOR$$

in which R represents an alkyl, alkenyl or cycloalkyl group which may be substituted, and X represents halogen.

The present invention furthermore relates to a process for preparing the above-identified compounds of the general Formula I, wherein urethanes of the formula $$H_2N\text{—}COOR$$

in which R has the meaning given above, are reacted, at temperatures in the range of from about −10 to about 150° C., preferably from about 20 to about 110° C., with at least 2 mols of formaldehyde or substances yielding formaldehyde and with at least stoichiometric amounts of a halogenating agent.

As starting substances, there may be used especially carbamic acid esters of aliphatic alcohols containing 1 to 20 carbon atoms whose carbon chain may be interrupted by hetero atoms such as oxygen, sulfur and/or nitrogen.

As halogenating agents there may be used inorganic or organic acid halides especially chlorides or bromides, for example thionyl chloride, thionyl bromide, phosphorus trichloride, phosphorus tribromide, phosphorus oxychloride, phosphorus pentachloride, oxalyl chloride, acetyl chloride, or phthaloyl chloride, but also other compounds which contain correspondingly activated halogen atoms, for example α,α-dichloromethyl-methyl ether. It is particularly advantageous to use phosphorus trichloride or, especially, thionyl chloride.

The formaldehyde may be reacted in the gaseous state with the urethane. It is of advantage, however, to use formaldehyde-yielding substances, for example formalin, trioxan and especially para-formaldehyde.

2 mols of formaldehyde are required for the reaction. In practice, it is in most cases advantageous to use a slight excess of formaldehyde or formaldehyde-yielding substances, for example about 10%. A greater excess of formaldehyde or formaldehyde-yielding substances generally does not bring any advantages. If, for example, thionyl chloride is used in the subsequent halogenation reaction, it may react with excess formaldehyde to yield methylene chloride, hydrogen chloride and sulfur dioxide. Thus, any excess formaldehyde which is present can be easily removed in the form of these volatile substances.

The process of the present invention permits the synthesis of hitherto unknown aliphatic N,N-bis-halogenomethyl-carbamic acid esters.

Although reactions of compounds of the same type are mentioned in Belgian Patent 633,027, the data are restricted according to Example 22a, to a N,N-bis-chloromethyl-carbamic acid aryl ester. On the other hand, the Belgian Pat. 621,378 cited in the said Belgian specification as describing the process of manufacture permits only the synthesis of N-alkyl - N - halogenomethyl-acylamines, but not of the claimed N,N-bis-halogenomethyl-carbamic acid esters. According to Belgian Pat. 621,378, the claimed bis-halogenomethyl-carbamic acid esters cannot be synthesized because the 1,3,5-tris-halogenomethyl-hexahydrous-s-triazines required therefor as starting substances are not known.

Furthermore, it is not possible to prepare the claimed N,N-bis-halogenomethyl-carbamic acid esters from N,N-bis-chloromethyl-carbamic acid chlorides, which are known, for example, from German Pat. 1,141,278, according to the following equation

because, according to Belgian Pat. 660,727, the halogen atoms of the α-halogenomethyl groups react before the chlorine atom of the carbamic acid chloride group with alcohol or alcoholates to yield bis-alkoxymethyl-carbamic acid chlorides:

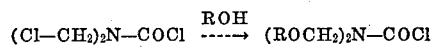

In contradistinction thereto, the N,N-bis-halogenomethyl-carbamic acid esters can be obtained according to the process of the present invention from condensation products of urethanes with at least 2 mols of formaldehyde and active halogeno compounds. Surprisingly, this reaction gives the bis-chloromethyl compounds in very good yields, despite the fact that according to German Auslegeschrift 1,222,037, table in column 1, the condensation of carbamic acid esters with 2 moles of formaldehyde merely leads to products which contain only about 50% of the theory of dimethylol carbamates. It had therefore to be expected that only mixtures of partly unstable chloromethyl compounds would be obtained, the more so since formaldehyde, when reacted with thionyl chloride for example, forms methylene chloride with separation of hydrogen chloride and sulfur dioxide.

A preferred method of carrying out the process of the invention consists in reacting 1 mol of urethane with 2 mols or a slight excess of formaldehyde or formaldehyde-yielding substances and allowing the reaction mixture, if desired after removal of the water, to react with the active halogeno compound. It is especially advantageous, for example, to heat 1 mol of urethane with 2.2 mols of para-formaldehyde in the presence of alkaline catalysts to temperatures between about 80° C. and about 110° C. and to stir until a homogeneous molten mass is formed. This molten mass is added dropwise to the active halogeno compound and is heated, if necessary, until the reaction is complete. In most cases, the reaction proceeds without it being necessary to heat.

The use of solvents is, in principle, not necessary; however, it may be suitable to use solvents in order to slow down too high a reaction speed or in order to facilitate the handling of solid or more viscous starting, intermediate or final products. As starting compounds in the process of the present invention, there may be mentioned, for example the following urethanes or carbamates: carbamic acid-methyl ester, -ethyl ester, -n-propyl ester, -i-propyl ester, -n-butyl ester, -i-butyl ester, -t-butyl ester, -n-pentyl ester, -i-pentyl ester, -n-hexyl ester, -β-ethylbutyl ester, -1,3,3-trimethylbutyl ester, -n-octyl ester, -undecyl ester, -n-dodecyl ester, -octadecyl ester, β-chloroethyl ester, -2-fluoroethyl ester, -3-chloropropyl ester, -2,3-dichloropropyl ester, -2,3-dibromopropyl ester, -4-chloro-n-butyl ester, -5-chloropentyl ester, -8-chlorooctyl ester, -2,2,2- trichloroethyl ester, -2-methoxyethyl ester, -2-ethoxyethyl ester, -2-n-propoxyethyl ester, -2-i-propoxyethyl ester, -2-n-butoxyethyl ester, -2-i-butoxyethyl ester, -2-t-butoxyethyl ester, -2-pentyloxyethyl ester, 2-(1-methylbutyl)-oxyethyl ester, -2-(2-methylbutyl)-oxyethyl ester, -allyl ester, -i-octenyl ester, -cyclopropylmethyl ester, -cyclobutylmethyl ester, -cyclohexyl ester, -2-methyl-cyclohexyl ester, -4-methyl-cyclohexyl ester, -cyclohexenyl ester, -2-methyl-thio-ethyl ester, and -2-dimethylaminoethyl ester.

The products of the present invention constitute mostly distillable colorless liquids which are completely stable when stored with exclusion of moisture. They are capable of reacting in various ways and may, therefore, be used as intermediates, for example, in the manufacture of textile auxiliaries and auxiliary agents for synthetic materials. Furthermore, the products may be used as cross-linking agents for cellulose.

The following examples illustrate the invention but they are not intended to limit it thereto, the parts by weight to parts by volume having the same ratio as the kilogram to the liter:

EXAMPLE 1

A mixture of 96.5 parts by weight of carbamic acid dodecyl ester, 40 parts by weight of para-formaldehyde and 1 part by weight of 33% sodium hydroxide solution was heated to 100–105° C. until the mixture formed a homogeneous molten mass (50 minutes). This molten mass was introduced dropwise, while still hot, into 300 parts by weight of previously distilled thionyl chloride having a temperature of 40° C. and stirred at this temperature until the evolution of HCl ceased. The excess of thionyl chloride was removed under reduced pressure, the residue was combined thrice with each time 100 ml. of absolute benzene, filtered and the solvent was each time removed under reduced pressure. The residue was then heated at a pressure of 0.1 to 0.5 mm. Hg for 15 to 30 minutes to 100° C.

Yield: 124 parts by weight=90% of the theory.
Hydrolyzable chlorine, determined according to Volhard:

|  | Percent |
| --- | --- |
| Found | 21.6 |
| Theor. | 21.8 |

Nuclear resonance spectrum:

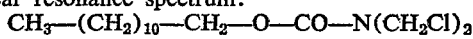

| Chem. shift, τ | Number of protons | Form of signal | Correlation |
| --- | --- | --- | --- |
| 4.66 | 4 | Singlet | $N(CH_2Cl)_2$ |
| 5.8 | 2 | Triplet | $O-CH_2-$ |
| 8.72 | 20 | Broad singlet | $-(CH_2)_{10}-$ |
| 9.12 | 3 | Triplet | $CH_3-$ |

EXAMPLE 2

A mixture of 145 parts by weight (1 mol) of carbamic acid β-ethyl-butyl ester, 70 parts by weight of para-formaldehyde and 1 part by weight of 33% sodium hydroxide solution was heated to 100–105° C. until a homogeneous molten mass had formed. The mixture was then introduced dropwise, at 40° C., into 500 parts by weight of previously distilled thionyl chloride and stirred for 8 hours at 40° C. The excess of thionyl chloride was removed under reduced pressure and the residue was distilled under reduced pressure.

Yield: 202 parts by weight=83% of the theory, boiling point 104–107° C. under a pressure of 0.05 mm. Hg.
Saponifiable chlorine:

|  | Percent |
| --- | --- |
| Found | 29.0 |
| Theoretical | 29.3 |

EXAMPLE 3

A mixture of 143 parts by weight (1 mol) of carbamic acid cyclohexyl ester, 70 parts by weight of para-formaldehyde and 1 part by weight of 33% sodium hydroxide solution was heated to 100–105° C. until a homogeneous molten mass had formed (40 minutes). The mixture was then introduced dropwise at 40° C. into 500 parts by weight of previously distilled thionyl chloride and stirred for 16 hours at 40° C. The excess of thionyl chloride was removed under reduced pressure and the residue was distilled under reduced pressure.

Yield: 151 parts by weight=63% of the theory. Boiling point 110–115° C. under a pressure of 0.3–0.45 mm. Hg.
Hydrolyzable chlorine:

|  | Percent |
| --- | --- |
| Found | 29.2 |
| Theor. | 29.5 |

EXAMPLE 4

The mixture of 101 parts by weight (1 mol) of carbamic acid allyl ester, 70 parts by weight of para-formaldehyde and 0.5 part by weight of 33% sodium hydroxide solution was heated to 100–105° C., until a homogeneous molten mass had formed (30 minutes). The mixture was then introduced dropwise, at 40° C., into 400 parts by weight of previously distilled thionyl chloride and stirred for 2 hours at 40° C. The excess of thionyl chloride was removed under reduced pressure and the residue was distilled under reduced pressure with the addition of a small amount of hydroquinone.

Yield: 150 parts by weight=76% of the theory. Boiling point 81–84° C. under a pressure of 0.3 mm. Hg.
Hydrolyzable chlorine:

|  | Percent |
| --- | --- |
| Found | 35.5 |
| Theor. | 35.8 |

EXAMPLE 5

50 parts by weight of n-octyl-urethane (0.289 mol) and 20 parts by weight of para-formaldehyde (0.668 mol) were heated with 0.2 ml. of 20% sodium hydroxide solution for 10 minutes to 100° C., whereupon a clear molten mass was obtained. This molten mass was added, within 30 minutes, to 350 parts by weight of thionyl chloride. The whole was heated to 40° C. until the evolution of gas ceased, which required about 2 hours. After removal of the excess of thionyl chloride, the pure N,N-bis-chloromethyl-n-octyl-urethane was obtained as a substance which passed over at 126° C. under a pressure of 0.05 mm. Hg.

The yield was 62 parts by weight=80% of theory.
$C_{11}H_{21}Cl_2N_1O_2$ (270.2) Volh.—Cl: Calculated: 26.3%. Found: 26.3%.

EXAMPLE 6

18 parts by weight of 4-chloro-n-butyl-urethane (0.119 mol) and 7 parts by weight of para-formaldehyde (0.234 mol) were homogenized by heating for 10 minutes to 100° C. and with addition of some drops of 20% sodium hydroxide solution. The molten mass was added dropwise, within 10 minutes, to 150 parts by weight of thionyl chloride having a temperature of 40° C. and the whole was heated for further 2 hours to 40° C. After removal of the excess of thionyl chloride by distillation under a water jet vacuum, the N,N-bis-chloromethyl-4-chlorobutylurethane in the pure state was obtained by distillation under reduced pressure. 21 parts by weight of pure product (=71% of the theory boiling at 121–124° C. under pressure of 0.1 mm. Hg were obtained.

The compound was found to be well soluble in aprotonic organic solvents.

$C_7H_{12}Cl_3N_1O_2$ (248.5).—Volh.—Cl: Calculated: 28.6%. Found: 28.2%.

In the same manner, there could be prepared from β-chloroethyl-urethane, the N,N-bis-chloromethyl-β-chloroethyl-urethane in a yield of 63% which was found to pass over at 115° C. under a pressure of 0.02 mm. Hg.

$C_5H_8Cl_3N_1O_2$ (220.5): Calculated (percent): C, 27.2; H, 3.6; Volh.—Cl, 32.2. Found (percent): C, 27.5; H, 3.8; Volh.—Cl, 31.7.

EXAMPLE 7

75 parts by weight of carbamic acid methyl ester were heated, for about 20 minutes, to 80–100° C., with 66 parts by weight of para-formaldehyde and 1 part by weight of triethylamine. The clear syrup obtained was added dropwise to 137 parts of phosphorus trichloride, dissolved in 320 parts by weight of benzene. After a short stirring, the phosphorous acid was separated and the benzene phase was distilled under reduced pressure. 151 parts by weight (88% of the theory) of N,N-bis-chloromethyl-carbamic acid methyl ester boiling at 100° C. under a pressure of 14 mm. Hg were obtained.

EXAMPLE 8

A condensation product of 234 parts by weight of n-butylcarbamic acid ester and 130 parts by weight of para-formaldehyde was added dropwise to 1300 parts by weight of thionyl chloride. After termination of the evolution of gas, the whole was distilled under reduced pressure. 379 g. of N,N-bis-chloromethyl-carbamic acid-n-butyl ester (88% of the theory) having a boiling point of 126° C./10 mm. Hg were obtained.

EXAMPLE 9

The clear molten mass obtained from 65 parts by weight of carbamic acid-i-butyl ester, 36 parts by weight of para-formaldehyde and a trace of NaOH was added dropwise, at room temperature, to 500 parts by weight of thionyl chloride. After termination of the separation of HCl, the whole was distilled under reduced pressure. 90 parts by weight (75% of the theory) of N,N-bis-chloromethyl-carbamic acid-i.butyl ester having a boiling point of 131° C./14 mm. Hg were obtained.

EXAMPLE 10

173 g. of carbamic acid-2-ethyl-hexyl ester, 66 parts by weight of para-formaldehyde and some drops of concentrated sodium hydroxide solution were heated to 80–100° C., until a clear molten mass had formed. This molten mass was added dropwise to 1200 parts by weight of thionyl chloride and the whole was then distilled under reduced pressure. Besides unconsumed thionyl chloride, 245 parts by weight of N,N-bis-chloromethyl-2-ethyl-hexyl carbamic acid ester (91% of the theory) having a boiling point of 165° C./11 mm. Hg, were obtained.

Hydrolyzable chlorine: Percent
  Found _____ 26.3
  Calc. _____ 26.2

EXAMPLE 11

The sirup obtained by condensation of 95 parts by weight of 2-methoxyethyl-carbamic acid ester and 52 parts by weight of para-formaldehyde in the presence of catalytic amounts of NaOH was added dropwise, at room temperature, to 500 parts by weight of thionyl chloride. After termination of the separation of gas, the whole was distilled under reduced pressure. 157 parts by weight of N,N - bis - chloromethyl-2-methoxy-ethyl-carbamic acid-ester (91%) having a boiling point of 140° C./11 mm. Hg and a content of hydrolyzable chlorine of 32.3% were obtained.

EXAMPLE 12

The homogeneous molten mass obtained by condensation of 58.5 parts by weight of carbamic acid n-butyl ester, 33 parts by weight of para-formaldehyde and 0.5 parts by weight of 33% sodium hydroxide solution was added dropwise, while cooling, at 40° C., to 157 parts by weight of acetyl chloride and stirred for 3 hours at 40° C. After completion of the reaction, the whole was distilled under reduced pressure. The N,N-bis-chloromethyl-carbamic acid-n-butyl ester was found to boil at 82–86° C./0.8 mm. Hg and to have a content of 31.8% of hydrolyzable chlorine.

EXAMPLE 13

The mixture of 76 parts by weight of carbamic acid-2,3-dichloro-n-propyl ester, 30 parts by weight of para-formaldehyde and 1.2 part by weight of 33% sodium hydroxide solution was heated to 100–105° C., until the mixture formed a homogeneous molten mass (30 minutes). The mixture was then added dropwise to 250 parts by weight of previously distilled thionyl chloride, stirred overnight at room temperatures and then for 2 hours at 40° C. The excess of thionyl chloride was removed under reduced pressure and the residue was distilled under reduced pressure. After redistillation, 29 g. (32% of the theory) of N,N-bis-chloromethyl-carbamic acid-2,3-dichloropropyl ester having a boiling point of 140° C./0.03 mm. Hg were obtained.

Cl: Percent
  Calc. _____ 52.7
  Found _____ 52.4

EXAMPLE 14

238 parts by weight of carbamic acid-2-methoxyethyl ester were reacted with 500 parts by weight of 30% formaldehyde solution at a pH-value of 5–10.0. Then, the water was removed by distillation under reduced pressure. About 360 parts by weight of a syrupy residue remained behind, which was added dropwise, at room temperature, to 2200 parts by weight of thionyl chloride. After termination of the evolution of gas, the whole was distilled under reduced pressure. In addition to unconsumed thionyl chloride, 385 parts by weight of N,N-bis-chloromethyl-carbamic acid-2-methoxyethyl ester (89% of the theory) and boiling at 140° C./11 mm. Hg were obtained.

EXAMPLE 15

117 parts by weight of carbamic acid-n-butyl ester with 70 parts by weight of para-formaldehyde and 1 part by weight of 33% sodium hydroxide solution were heated, for about 30 minutes, to 100° C., until a clear molten mass had formed. This molten mass was added dropwise, at 10–15° C., to a solution of 200 parts by weight of phosphorus tribromide in 400 parts by weight of chloroform and the whole was stirred for about 20 hours at room temperature. The chloroform solution was separated from the phosphorous acid and distilled under reduced pressure. 200 parts by weight of N,N-bis-bromomethyl-carbamic acid-n-butyl ester boiling at 92–94° C./0.006 mm. Hg were obtained, corresponding to a yield of 66% of the theory. $C_7H_{13}Br_2NO_2$.—Volh.—Br: Calculated: 52.7%; Found: 52.4%.

EXAMPLE 16

95 parts by weight of 2-methoxy-ethyl-carbamic acid ester were stirred for about 10 minutes, at 80° C., with some drops of 2 normal NaOH and 52 parts by weight of para-formaldehyde. To the almost clear molten mass obtained, there were added dropwise, while cooling, 500 parts by weight of thionyl chloride. After termination of the evolution of gas, the whole was distilled under reduced pressure. Yield: 109 parts by weight of N,N-bis-chloromethyl-2-methoxy-ethyl-carbamic acid ester boiling at 153° C. under a pressure of 25 mm. Hg (63% of the theory).

EXAMPLE 17

95 parts by weight of 2-methoxy-ethyl-carbamic acid ester were dissolved in 500 parts by weight of thionyl chloride. 52 parts by weight of para-formaldehyde were added portionwise, while slightly cooling, and the whole was stirred for about 6 hours at room temperature until the evolution of gas was terminated. The N,N-bis-chloromethyl-2-methoxy-ethyl-carbamate (boiling point 153°

EXAMPLE 18

1120 parts by weight of carbamic acid-iso-tridecyl ester were mixed with 307.5 parts by weight of para-formaldehyde and the mixture was heated to 60° C. Then, the whole was heated for about 30 minutes to 60° C., with addition of a total of 8 parts by weight of 20% sodium hydroxide solution, until a clear solution had formed. 443 parts by weight of phosphorus trichloride were then added dropwise, within 4 hours, at a temperature of below 25° C., while cooling, to the crude dimethylol-carbamate. The whole was stirred for 30 minutes at room temperature. After heating for 2 hours to 70° C., the phosphorous acid formed could be separated in a separating funnel.

Yield: 1545 parts by weight of N,N-bis-chloromethyl-carbamic acid iso-tridecyl ester containing 20.2% of Cl (cal.: 21.1%).

We claim:
1. A compound of the formula

$$(XCH_2)_2N-COOR$$

wherein X is chlorine or brominne and R has 1 to 20 carbon atoms and is alkyl, haloalkyl, alkoxyalkyl, or alkenyl, or is cycloalkyl having 3 to 6 carbon atoms, cycloalkyl-alkyl having 4 to 10 carbon atoms, lower alkyl-cycloalkyl having 4 to 10 carbon atoms, or cyclohexenyl.

2. A compound of the formula $$(ClCH_2)_2N-COOC_nH_{2n+1}$$

in which $n$ is an integer from 1 to 20.

3. The compound of the formula $$n\text{-}C_4H_9-OCO-N(CH_2Cl)_2$$

4. The compound of the formula $$CH_3-O-CH_2-CH_2-OCO-N(CH_2Cl)_2$$

5. The compound of the formula $$i\text{-}C_{13}H_{27}-OCO-N(CH_2Cl)_2$$

6. The compound of the formula $$H_2C=CH-CH_2-OCO-N(CH_2Cl)_2$$

References Cited

FOREIGN PATENTS 1,316,042  1/1962  France ............... 260—482

OTHER REFERENCES

C.A. 4:1162² or Ber. 43 322–36, 1910.

LORRAINE A. WEINBERGER, Primary Examiner

P. J. KILLOS, Assistant Examiner